UNITED STATES PATENT OFFICE.

JAMES HENDERSON, OF BELLEFONTE, PENNSYLVANIA.

COMPOUND FOR FURNACE-LININGS AND FIRE-BRICK.

SPECIFICATION forming part of Letters Patent No. 279,158, dated June 12, 1883.

Application filed November 18, 1882. (No specimens.)

*To all whom it may concern:*

Be it known that I, JAMES HENDERSON, of Bellefonte, county of Centre, State of Pennsylvania, have invented a new and useful Improvement in Compounds for Furnace-Linings and Fire-Brick, of which the following is such full, clear, and exact description as will enable others skilled in the art to which it most nearly appertains to make and use the same.

This invention relates to the formation of a compound for furnace-linings and fire-brick, consisting of silica in a finely-divided state and magnesian lime, which, with water, forms a binding agent.

This my invention is an improvement on the invention set forth and described in Letters Patent No. 265,074, dated September 26, 1882, granted to me, and is founded on the discovery that for some purposes a greater amount of magnesian lime may be used in a compound of silica, magnesian lime, and water than is set out in the specification of the Letters Patent referred to, and a good refractory brick or lining made therefrom.

In carrying out this my invention I use washed river-sand—such as is used for covering the hearth of iron heating-furnaces—which is free from oxide of iron, or pulverized sand-stone, such as is used in the manufacture of glass. The sand may be used as found; but I prefer to grind it to the fineness of flour. To the silicia I add magnesian lime, which should be as free as possible from other substances that will form fusible compounds with the silica and lime of the magnesian lime. The magnesian lime should be calcined and hydrated with water and dried and reduced to a fine flour. This is added to the silica in such proportions as to make about ten to twenty per cent. of magnesian lime, by weight, to the mixture. The silicia and magnesian lime are preferably mixed in the dry state, and sufficient water added to make the mass cohere; or the lime may be mixed with the water to the consistency of milk of lime and be mixed with the sand to form a thick mortar. In this condition it may be added to the furnace-hearth or other metallurgical vessel, and becomes solid and hardened when dried at the ordinary temperature or when exposed to high temperatures, and can be advantageously applied as a lining for vertical walls, or to form them of it entire. It is an economical substitute for fire-brick, and does not, by reason of the proportions, contract when exposed to the high temperatures of a steel melting-furnace, and will set into a hard, compact, non-friable mass when dried.

The above-described compound may be molded into brick and dried at the ordinary temperature and be fit for use, or burned in kilns and used as linings in the form of brick. Lime such as contains large proportions of magnesia, produced from the purest dolomites of Springfield, Ohio, and which has been preferably calcined below redness and slaked or hydrated with water, is preferred for this purpose, as the magnesia and lime it contains are nearly pure, give it binding qualities, and cause it to harden upon mixture with water and exposure to the air.

I do not wish to limit myself to exact proportions, and may make for some purposes a compound containing ten (10) per cent. of magnesian lime, while in compounds for other purposes twenty (20) per cent. will be added to the silica.

Lime and silica and water have been before used as a compound for mortar and other purposes, and I do claim the same.

What I claim, and desire to secure by Letters Patent, is—

The compound for furnace-linings and fire-brick, consisting of silica, ten (10) per cent., by weight, of magnesian lime, and water, as specified and set forth.

JAMES HENDERSON.

Witnesses:
ARTHUR D. HENDERSON,
JOHN C. SAYLOR.